United States Patent
Okano et al.

(10) Patent No.: US 9,141,229 B2
(45) Date of Patent: Sep. 22, 2015

(54) COORDINATE INPUT DEVICE AND TOUCH PANEL DEVICE

(75) Inventors: Yuichi Okano, Tokyo (JP); Shogo Yoneyama, Tokyo (JP); Yuichi Sasaki, Tokyo (JP); Seiichiro Mori, Tokyo (JP); Takenori Kawamata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 120 days.

(21) Appl. No.: 13/985,481

(22) PCT Filed: Feb. 18, 2011

(86) PCT No.: PCT/JP2011/000913
§ 371 (c)(1),
(2), (4) Date: Aug. 14, 2013

(87) PCT Pub. No.: WO2012/111042
PCT Pub. Date: Aug. 23, 2012

(65) Prior Publication Data
US 2013/0321318 A1   Dec. 5, 2013

(51) Int. Cl.
*G06F 3/041*   (2006.01)
*G06F 3/044*   (2006.01)

(52) U.S. Cl.
CPC ............. *G06F 3/0418* (2013.01); *G06F 3/044* (2013.01)

(58) Field of Classification Search
CPC ..... G06F 3/0418; G06F 3/044; G06F 3/0412; G06F 3/0414; G06F 3/042
USPC ......... 345/173–184; 178/18.01–18.03, 18.06, 178/20.01
See application file for complete search history.

(56) References Cited

U.S. PATENT DOCUMENTS

| | | | |
|---|---|---|---|
| 4,616,107 A | | 10/1986 | Abe et al. |
| 5,675,130 A | * | 10/1997 | Sekizawa .................. 178/18.07 |
| 5,825,352 A | * | 10/1998 | Bisset et al. .................. 345/173 |
| 5,986,646 A | * | 11/1999 | Chen et al. .................... 345/173 |
| 6,246,393 B1 | * | 6/2001 | Watanabe et al. ............. 345/173 |
| 8,089,470 B1 | * | 1/2012 | Schediwy et al. ............. 345/173 |
| 2002/0039092 A1 | * | 4/2002 | Shigetaka ..................... 345/156 |
| 2006/0244735 A1 | * | 11/2006 | Wilson .......................... 345/173 |
| 2007/0008298 A1 | * | 1/2007 | Ohta ............................. 345/173 |

(Continued)

FOREIGN PATENT DOCUMENTS

| | | |
|---|---|---|
| JP | 60 181816 | 9/1985 |
| JP | 09 034627 | 2/1997 |
| JP | 10 020992 | 1/1998 |

(Continued)

OTHER PUBLICATIONS

International Search Report Issued May 24, 2011 in PCT/JP11/00913 Filed Feb. 18, 2011.

*Primary Examiner* — Amare Mengistu
*Assistant Examiner* — Gloryvid Figueroa-Gibson
(74) *Attorney, Agent, or Firm* — Oblon, McClelland, Maier & Neustadt, L.L.P.

(57) ABSTRACT

A coordinate input device and a touch panel device determine a correction value with a plurality of output values obtained from a plurality of sensors arranged in a touch panel based on the output value of a 1st peak sensor that outputs the largest output value, the output value of a 2nd peak sensor having the second largest output value, the output value of a 3rd peak sensor having the third largest output value, and the output value of a 4th peak sensor having the fourth largest output value.

20 Claims, 6 Drawing Sheets

(56) References Cited

U.S. PATENT DOCUMENTS

2010/0066701 A1* 3/2010 Ningrat .................. 345/174
2012/0098783 A1* 4/2012 Badaye et al. ............ 345/174

FOREIGN PATENT DOCUMENTS

JP      2010 191778     9/2010
JP      2010 267251    11/2010

* cited by examiner (a)

(b)

COORDINATE INPUT DEVICE AND TOUCH PANEL DEVICE

TECHNICAL FIELD

The present invention relates to a coordinate input device and a touch panel device for determining a coordinate of an input position in a touch panel.

BACKGROUND ART

As a device for determining a detailed coordinate position thereof by interpolation of the coordinates of an input position coming in contact with a finger or the like with the output values of sensors of a touch panel, there is "a coordinate input device and a coordinate input system" disclosed in Patent Document 1, for example. This coordinate input device determines a detailed coordinate position on the basis of the magnitudes of electrostatic capacitances produced by the contact finger on the sensors of the touch panel arranged in a strip shape.

FIG. 11 is a diagram (cross-sectional view of a touch panel) for illustrating how to determine a coordinate position by a coordinate input device disclosed in Patent Document 1: Reference numerals 4, 5, 6, 7 and 8 designate sensors, numeral 20 designates a finger, numeral 30 designates an overlay 30 disposed on the sensors, and reference sign L designates each width of the finger 20 and the sensor. In this example, the finger 20 is in contact at a position displaced from the sensor 6 by a distance d toward and over the sensor 7. Here, C1 represents the magnitude of an electrostatic capacitance due to an overlapping portion (L−d) between the finger 20 and sensor 6; C2a represents the magnitude of an electrostatic capacitance due to an overlapping portion (d) between the finger 20 and the sensor 7; C2b represents the magnitude of an electrostatic capacitance produced toward the sensor 7 through the overlay 30 from the portion other than the overlapping portion (d), that is, the portion (L−d); and C3 represents the magnitude of an electrostatic capacitance produced toward the sensor 5 through the overlay 30 from the overlapping portion (L−d) between the finger 20 and sensor 6. Then, it is contemplated that the distance d is determined taking account of the effects of the above capacitances C3 and C2b, and that the detailed coordinate position is determined based on the distance.

PRIOR ART DOCUMENTS

Patent Documents

Patent Document 1: Japanese Unexamined Patent Application Publication No. 2010-191778

SUMMARY OF THE INVENTION

Problems to be Solved by the Invention

However, in the foregoing conventional coordinate input device, the magnitude of an electrostatic capacitance that has an effect on the sensor 6 and the sensor 8 from the overlapping portion (d) between the finger 20 and sensor 7 through the overlay 30 is not taken into consideration; thus, there is a problem that, for example, in a case where the overlay is made thicker, an error occurs at the time of calculating the detailed coordinate position, so that linearity in coordinate calculation performance is deteriorated.

The present invention is made to solve the aforementioned problem, and an object of the invention is to provide the following coordinate input device and touch panel device: when on the basis of the sensor output values obtained from the sensors of the touch panel, a correction value is determined for the interpolation of an input coordinate position from the output value of a peak sensor and the output value of its peripheral sensor, a correction value is determined taking further the dimension of the electrostatic capacitance that has an effect through the overlay in consideration, and it is possible to determine the detailed coordinate position with excellent accuracy with the correction value.

Means for Solving the Problems

In order to accomplish the above object, according to the invention, there is provided a coordinate input device for determining a coordinate of an overlapping position of an object to a touch panel, including: a peak sensor detection unit for detecting a sensor that outputs the largest output value with a plurality of output values obtained from a plurality of sensors arranged in the touch panel to select a 1st peak sensor; a correction value calculation unit for determining a correction value on the basis of information of an output value of the 1st peak sensor detected by the peak sensor detection unit and information of an output value of a peripheral sensor of the 1st peak sensor; and a coordinate calculation unit for determining a detailed coordinate of the overlapping position with the correction value calculated by the correction value calculation unit, and the correction value calculation unit selects a 2nd peak sensor having the second largest output value next to the output value of the 1st peak sensor and a 3rd peak sensor having the third largest output value from sensors on both ends of the 1st peak sensor, selects a 4th peak sensor having the fourth largest output value on the basis of a position of the 2nd peak sensor, and determines the correction value on the basis of the output value of the 1st peak sensor, the output value of the 2nd peak sensor, the output value of the 3rd peak sensor, and the output value of the 4th peak sensor.

Effect of the Invention

According to the coordinate input device according to the invention, with a plurality of output values obtained from a plurality of sensors 1 to 9 arranged in a touch panel 10, a correction value is determined based on the output value of the 1st peak sensor that outputs the largest output value, the output value of the 2nd peak sensor having the second largest output value, the output value of the 3rd peak sensor having the third largest output value, and the output value of the 4th peak sensor having the fourth largest output value to thereby calculate a detailed coordinate position; thus, for example, even in a case where the overlay such as glass is thicker, an error at the time of calculating the detailed coordinate position can be reduced to thereby determine more accurately the detailed coordinate position coming in contact with a finger.

BEST MODE FOR CARRYING OUT THE INVENTION

Hereinafter, in order to explain the present invention in more detail, embodiments for carrying out the invention will be described with reference to the accompanying drawings.

Embodiment 1

Figure 1:
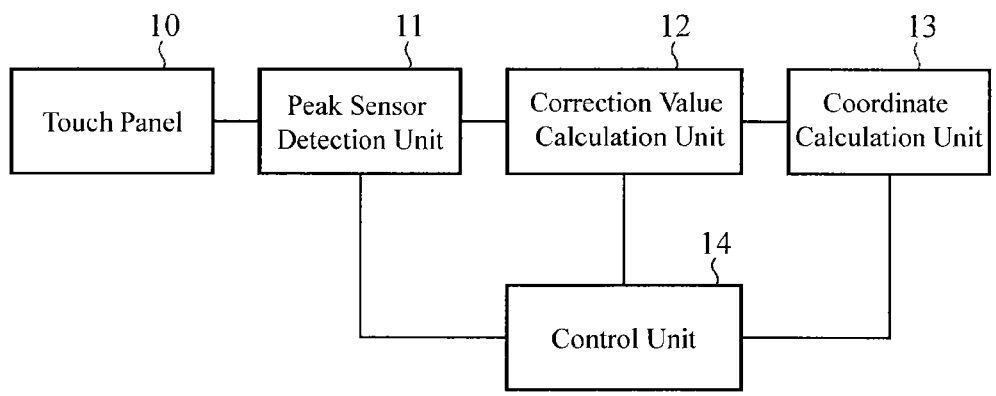
FIG. 1 is a block diagram showing a configuration of a coordinate input device according to Embodiment 1 of the present invention.

FIG. 1 is a block diagram showing a configuration of a coordinate input device according to Embodiment 1 of the invention. The coordinate input device includes: a peak sensor detection unit 11 for determining a sensor number producing the largest output value in each of X and Y directions thereof from among a plurality of sensors with output values of a projected-capacitive touch panel 10 in which a plurality of sensor electrodes are arranged in the X and Y directions; a correction value calculation unit 12 for determining a correction value for coordinate position interpolation from the output value of a peak sensor thereof and the output value of its peripheral sensor; a coordinate calculation unit 13 for determining a detailed coordinate value on the basis of the correction value; and a control unit 14 for controlling the relevant units.

Figure 2:
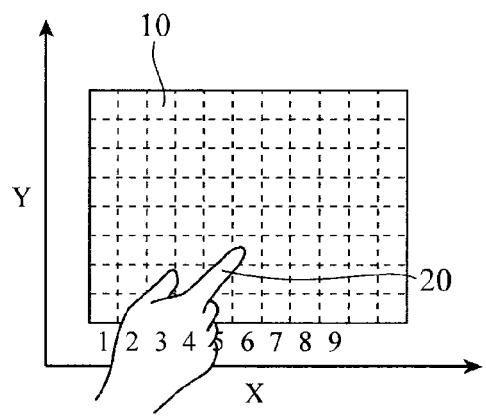
FIG. 2 is an explanatory diagram showing a configuration of a touch panel of the coordinate input device according to Embodiment 1 of the invention.

FIG. 2 is an explanatory diagram showing a configuration of the touch panel 10, and illustrates a condition where an object such as a coordinate pointer (represented as a finger 20 in this embodiment) is in contact with the touch panel 10. Hereinafter, for the sake of convenience in description, among the sensors arranged in the touch panel 10, the sensors in the X direction are called sensors 1 to 9 in order from the origin of X-axis. In FIG. 2, there is illustrated a condition where the finger 20 is in contact with a point that is positioned in a manner shifted slightly from the sensor 6 toward the sensor 5.

Next, an operation of this embodiment will be described by using a condition shown in FIG. 2 as an example.

Figure 3:
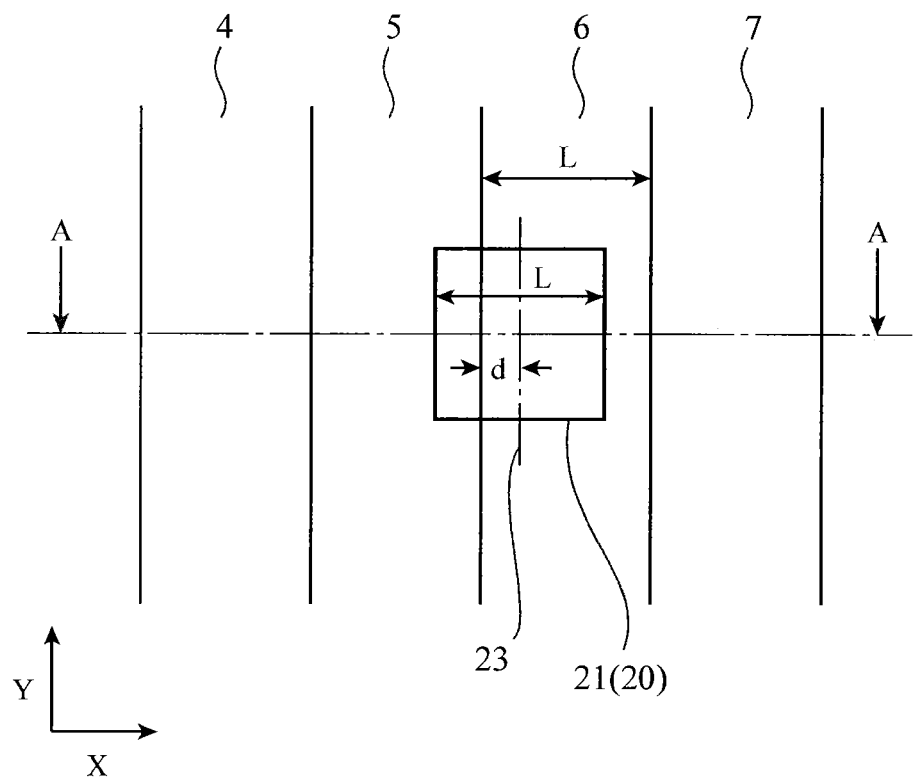
FIG. 3 is an explanatory diagram showing an area of a region in which a finger comes in contact with the touch panel in the coordinate input device according to Embodiment 1 of the invention.

FIG. 3 is an explanatory diagram showing an area of a region in which the finger 20 is in contact with the touch panel 10, and shows with enlarging the corresponding part of the sensors 4 to 7 in a strip shape that are arranged in the touch panel 10 around the finger 20 as shown in FIG. 2 as a center. In this embodiment, for the sake of simplicity in description, a region in which the finger 20 is in contact with parts of the sensor 5 and sensor 6 in a straddling manner is treated as a quadrangular contact region (overlapping region) 21. Specifically, the contact region 21 is located at a position that is shifted from a boundary position between the sensor 5 and sensor 6 arranged in the X-direction toward the sensor 6 by a length "d" (converted value into a coordinate value). Note that a reference numeral 23 in FIG. 3 indicates a line passing through the center of the contact region 21. Further, for the sake of simplicity in description, a width of each of the sensors 4 to 7 and the contact region 21 is given as "L" (converted value into a coordinate value).

Figure 4:
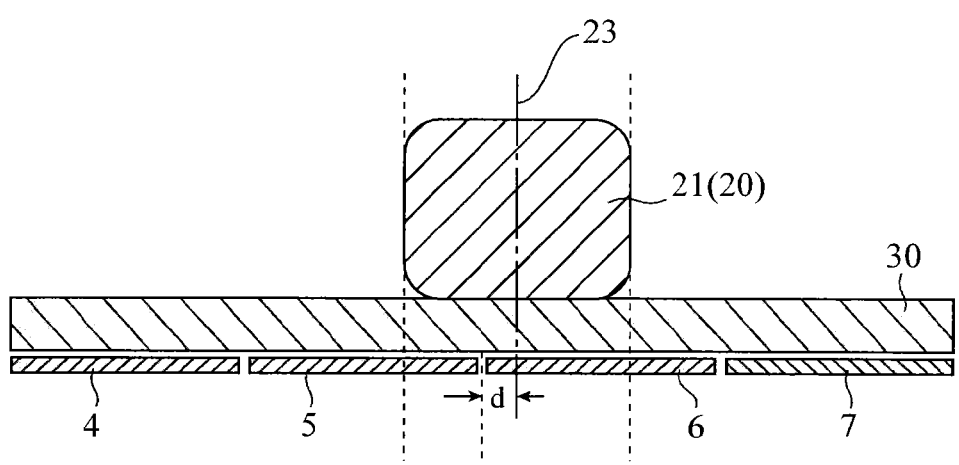
FIG. 4 is an explanatory diagram showing a cross-section of the touch panel and finger in a case where the finger comes in contact with the touch panel in the condition shown in FIG. 3.

FIG. 4 is a diagram showing a cross section taken along a line A-A of FIG. 3 in a case where the finger 20 comes in contact with the touch panel 10 in the condition shown in FIG. 3. In the touch panel 10 of this embodiment, a thick overlay 30 such as a guard glass is disposed on the sensors for the purpose of protection of the sensors and the like.

Figure 5:
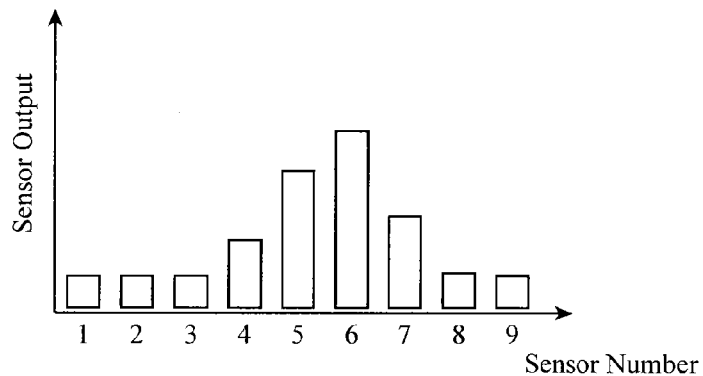
FIG. 5 is a graph showing output values of sensors 1 to 9 when the finger comes in contact with the touch panel in the condition shown in FIG. 3.

FIG. 5 is a graph showing the output values of the sensors 1 to 9 in the case where the finger 20 comes in contact with the touch panel 10 in the condition shown in FIG. 3: the sensor numbers of the sensors 1 to 9 are shown in the abscissa; and the magnitudes of the output values of the sensors 1 to 9 are shown in the ordinate. As shown in FIG. 5, the output value of the sensor 6 nearest to the contact position of the finger 20 is the largest, and the output value of the sensor 5 in partial contact with the finger 20 is the second largest. In addition, since the right-adjacent sensor 7 of the sensor 6, and the left-adjacent sensor 4 of the sensor 5 are effected by the finger 20 though the overlay 30, the output value thereof becomes larger than that of the other sensors.

In this connection, a scheme of how the output value of the sensor is obtained when the finger comes in contact with the touch panel will be briefly described. Although several methods for detecting the contact of the finger are conceived, the contact of the finger 20 is detected in this embodiment by a method of detecting an electrostatic capacitance between the finger 20 and the sensors arranged in the touch panel 10. Specifically, an AC voltage for signal detection is applied sequentially to the sensors 1 to 9 arranged in the touch panel 10 (voltage applying means is not shown in FIG. 1 and so on). When the finger 20 comes in contact with the touch panel 10, a minute capacitance is produced between the sensors in the touch panel 10 and the finger 20 that is a conductor. Due to the AC voltage applied to the sensor, a weak current flows from the sensor to the finger 20 through the minute capacitance. At this time, when the output voltage from the sensor is measured, the aforementioned currents flow through the sensors around the point coming in contact with the finger 20, and hence the output voltages to be measured are decreased. The magnitudes of the decreases of the output voltages are determined as the output values for the sensors 1 to 9.

Figure 6:
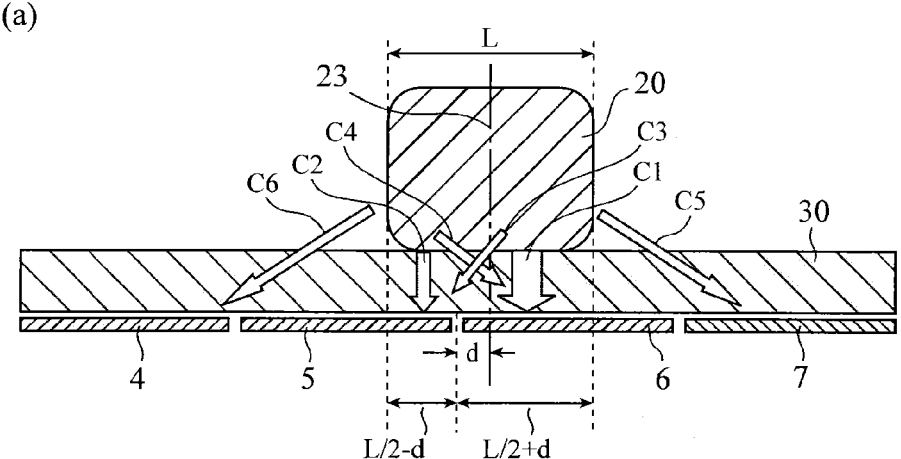
FIG. 6 is an explanatory diagram showing schematically a scheme in which a sensor output value is obtained when the finger comes in contact with the touch panel in the coordinate input device according to Embodiment 1 of the invention.
Figure 6:
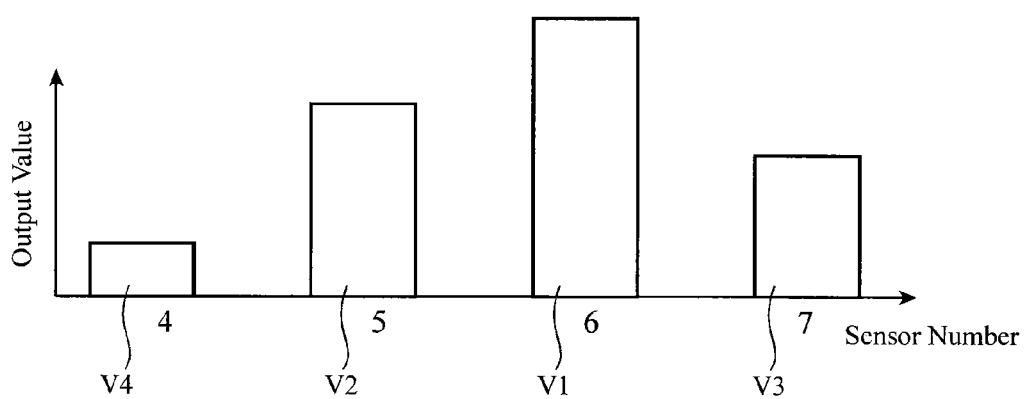

FIG. 6 is an explanatory diagram representing schematically the scheme of how the output values of the sensors are obtained when the finger 20 comes in contact with the touch panel 10: FIG. 6(a) is a cross-sectional view of the finger 20 and touch panel 10 taken along the line A-A shown in FIG. 3; and FIG. 6(b) is a chart of the output values of the sensors 4 to 7 extracted from the graph of FIG. 5. In FIG. 6(a), the overlay 30 such as the protective glass placed on the sensors of the touch panel 10 should be generally provided on the sensors for the purpose of protection of the sensors, and the like. The finger 20 and sensor 6 come in contact with each other over an overlapping portion with a length of (L/2+d), and a length of an overlapping portion of the finger 20 and the sensor 5 becomes (L/2−d).

In this context, the electrostatic capacitance produced between the finger 20 and sensor 6 is taken into consideration. As shown in FIG. 6(a), the magnitude of the electrostatic capacitance produced due to the overlapping portion (L/2+d) of the finger 20 and sensor 6 is given as "C1". Further, the magnitude of the electrostatic capacitance produced on the sensor 6 through the overlay 30, due to a portion other than the overlapping portion (L/2+d) of the finger 20 and the sensor 6, that is, the portion (L/2−d), is given as "C4". In such a way, the whole electrostatic capacitance produced between the finger 20 and sensor 6 is considered by separating the electrostatic capacitance C1 due to the overlapping portion (L/2+d) with the finger 20 from the electrostatic capacitance C4 due to an effect through the overlay 30 by the portion other than the overlapped portion (L/2+d), that is, the portion (L/2−d).

Similarly, an electrostatic capacitance between the finger 20 and the sensor 5 is taken into consideration. The magnitude of the electrostatic capacitance produced due to the overlapping portion (L/2−d) of the finger 20 and the sensor 5 is given as "C2", and the magnitude of the electrostatic capacitance produced through the overlay 30 due to a portion other than the overlapping portion (L/2−d), that is, the portion (L/2+d), is given as "C3".

Besides, when the thick overlay 30 is disposed as in this embodiment, electrostatic capacitances are produced not only on the sensor 5 and sensor 6 having overlapping portions with the finger 20, but also on their adjacent sensor 4 and sensor 7 through the overlay 30. Specifically, the magnitude of the electrostatic capacitance produced in the sensor 7 through the overlay 30 from the overlapping portion (L/2+d) of the finger 20 and sensor 6 is given as "C5".

Similarly, the magnitude of the electrostatic capacitance produced in the sensor 4 through the overlay 30 from the overlapping portion (L/2−d) of the finger 20 and sensor 5 is given as "C6".

Figure 7:
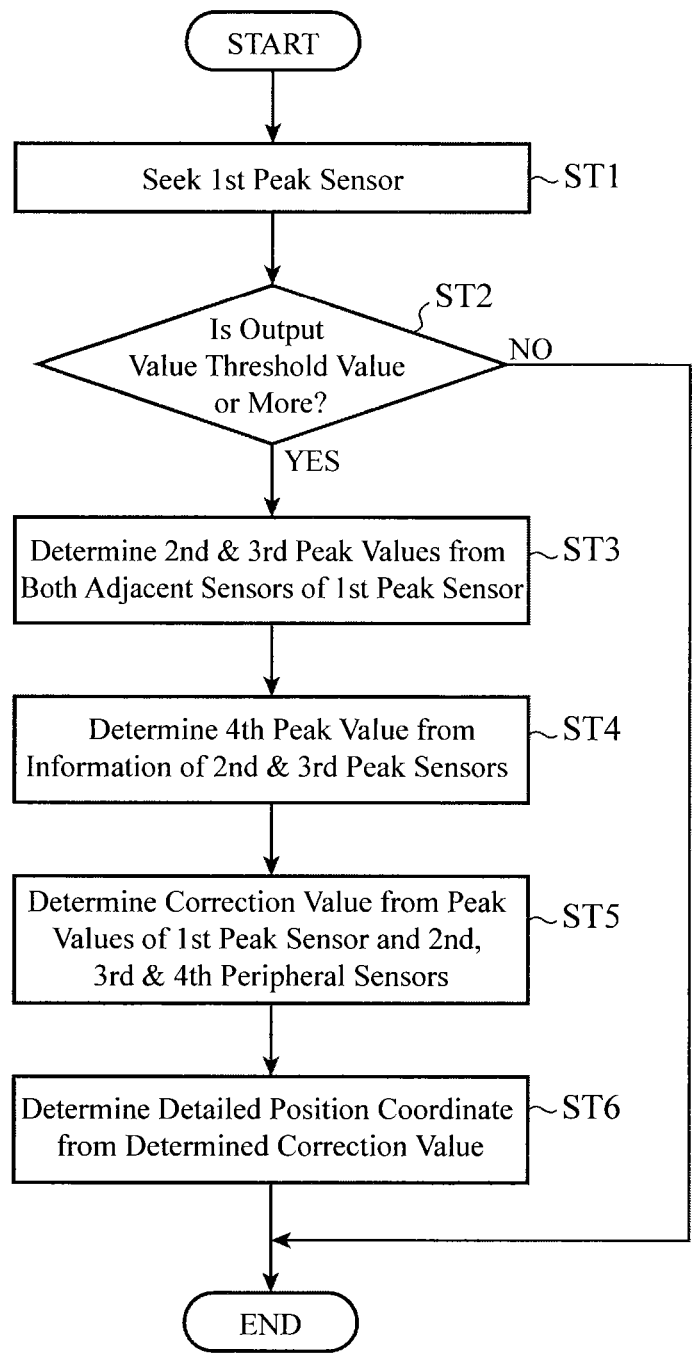
FIG. 7 is a flowchart showing an operation of the coordinate input device according to Embodiment 1 of the invention.

Next, an operation of the coordinate input device will be described by using the condition shown in FIG. 2 as an example. FIG. 7 is a flowchart showing an operation of the coordinate input device according to Embodiment 1. First, when the finger 20 comes in contact with the touch panel 10 as shown in FIG. 2, the output values are obtained according to a contact condition of the finger 20 from the sensors 1 to 9 in the touch panel 10 as mentioned above.

In Step ST1, the peak sensor detection unit 11 determines a peak sensor having the largest output value (1st peak sensor) based on data of the output values of the sensors 1 to 9 obtained from the touch panel 10. Specifically, the peak sensor detection unit 11 sequentially compares the output values of the sensors arranged in the X-direction, and decides the sensor having the largest value as a peak sensor (1st peak sensor) in the X-direction. According to the graph in FIG. 5, the sensor 6 is the 1st peak sensor.

Similarly, the peak sensor detection unit 11 also determines a peak sensor (1st peak sensor) in the Y-direction from the output values of the sensors arranged in the Y-direction. At this point, the control unit 14 stores in a buffer (not shown) information of the peak sensors (1st peak sensors) determined by the peak sensor detection unit 11. The coordinate values in the 1st peak sensor represent a reference coordinate position in determination of a detailed coordinate position described later.

In Step ST2, the control unit 14 judges whether or not the output value by the 1st peak sensors determined in Step ST1 is a predetermined threshold value or more. Specifically, the control unit 14, for example, judges the output value to be the threshold value or more in a case where each of the output value of the peak sensor in the X-direction and the output value of the peak sensor in the Y-direction is the threshold value or more (Step ST2 "YES"). The threshold value should be determined in advance, for example, in a manner defined as an output value of the peak sensor at the time when the finger 20 comes in slight contact with the touch panel 10.

In a case where the output value by the 1st peak sensors is the threshold value or more, the correction value calculation unit 12 determines in the following Step ST3 a 2nd peak value and a 3rd peak value from the output values of both adjacent sensors of the 1st peak sensor. Namely, the correction value calculation unit 12 compares the output values of both adjacent sensors of the 1st peak sensor to each other, and decides the sensor having a larger output value as a 2nd peak sensor with defining its output value as the 2nd peak value, and decides the sensor having a smaller output value as a 3rd peak sensor with defining its output value as the 3rd peak value. According to the graph in FIG. 5, the output value of the sensor 5 is the 2nd peak value, and the output value of the sensor 7 is the 3rd peak value.

In the following Step ST4, the correction value calculation unit 12 determines a 4th peak value from information of the 2nd peak sensor and 3rd peak sensor. Specifically, out of both adjacent sensors of the 2nd peak sensor, the sensor that is not the 1st peak sensor, that is, the sensor 4 in an example of FIG. 5, is decided as a 4th peak sensor, and its output value is defined as the 4th peak value.

In the following Step ST5, the correction value calculation unit 12 calculates a correction value for determining the detailed coordinate position by interpolating the reference coordinate position with the output value of the 1st peak sensor, the 2nd peak value, the 3rd peak value and the 4th peak value.

Here, a method for determining the correction value will be described by reference to FIG. 6. In FIG. 6(b), there is shown a relationship between the electrostatic capacitances C1, C2, C3, C4, C5 and C6 that are produced between the finger 20 and the sensors 4 to 7 shown in FIG. 6(a), and the respective output values V4, V2, V1 and V3 of the sensors 4 to 7. Since the output value of the sensor is proportional to the magnitude of the electrostatic capacitance, the output value of the sensor 6 where the electrostatic capacitances C1 and C4 are produced becomes the largest value, which is the 1st peak sensor's output value V1. The output value of the sensor 5 becomes the value V2 proportional to C2 and C3. Also, the output value of the sensor 7 becomes the value V3 proportional to C5, and the output value of the sensor 4 becomes the value V4 proportional to C6.

From the above description, the 1st peak sensor's output value V1, the 2nd peak value V2, the 3rd peak value V3 and the 4th peak value V4 can be represented by the following formulae (1) to (4), respectively:

$$V1 = f(C1) + f(C4) \qquad (1)$$

$$V2 = f(C2) + f(C3) \qquad (2)$$

$$V3 = f(C5) \qquad (3)$$

$$V4=f(C6) \tag{4}$$

where "f" is the function defining the relationship between the value of the electrostatic capacitance and the output value of the sensor.

Here, the correction value calculation unit 12 determines the shift amount d of the finger 20 from the boundary between the sensor 5 and sensor 6 toward the sensor 6 by the following manner. Generally, the magnitude of an electrostatic capacitance produced between two conductors is inversely proportional to a distance between the conductors, but proportional to an area thereof. For this reason, it is considered that the electrostatic capacitance C1 produced between the finger 20 and sensor 6 is proportional to the area of the overlapping portion (L/2+d) between the finger 20 and sensor 6. Similarly, it is considered that the electrostatic capacitance C2 produced between the finger 20 and sensor 5 is proportional to the area of the overlapping portion (L/2−d) between the finger 20 and sensor 5.

In this embodiment, the contact region 21 of the finger 20 is assumed to be quadrangular as shown in FIG. 3, and hence an area ratio of the overlapping regions of the finger 20 with the sensor 6 and sensor 5 is represented as (L/2+d): (L/2−d). Since the electrostatic capacitances C1 and C2 are proportional to the contact areas, the following formula (5) is established:

$$f(C1){:}f(C2)=(L/2+d){:}(L/2-d) \tag{5}$$

When the shift amount d is determined from the formula (5), it is represented as the following formula (6):

$$d=\{(f(C1)-f(C2))/(f(C1)+f(C2))\}\times L/2 \tag{6}$$

Here, C3 and C5 represent the magnitudes of the electrostatic capacitances (effecting the sensors 5 and 7, respectively) produced through the overlay 30 from the overlapping portion (L/2+d) between the finger 20 and sensor 6. Then, it is assumed that the magnitudes of C3 and C5 are equal to each other.

Similarly, C4 and C6 represent the magnitudes of electrostatic capacitances (effecting the sensors 6 and 4, respectively) produced through the overlay 30 from the overlapping portion (L/2−d) between the finger 20 and sensor 5. Then, it is assumed that the magnitudes C4 and C6 are equal to each other.

From the above description, when the formulae (1) to (4) are deformed on the assumption that f(C3)=f(C5) and f(C4)=f(C6), and the following formula (7) and formula (8) are obtained:

$$V1-V4=f(C1) \tag{7}$$

$$V2-V3=f(C2) \tag{8}$$

Then, from the formulae (6), (7) and (8), the shift amount d can be determined by the following formula (9) with the output values V4, V2, V1 and V3 of the sensor 4 to sensor 7:

$$d=\{(V1-V2+V3-V4)/(V1+V2-V3-V4)\}\times L/2 \tag{9}$$

As described above, in Step ST5, the correction value calculation unit 12 determines the shift amount d according to the formula (9) based on the output value V1 of the 1st peak sensor, the 2nd peak value V2, the 3rd peak value V3, and the 4th peak value V4, and decides the resultant as a correction value d.

Lastly, in Step ST6, the coordinate calculation unit 13 determines the detailed coordinate position based on the correction value d determined in Step ST5. Specifically, assuming that the coordinate position of the boundary position between the 1st peak sensor and 2nd peak sensor is represented as a reference coordinate position Xp, the coordinate calculation unit 13 determines a detailed coordinate position X by interpolation of the reference coordinate position Xp with the correction value d according to the following formula (10):

$$X=Xp+k\times d \tag{10}$$

where k=1 is given in a case where the 2nd peak sensor is positioned farther than the 1st peak sensor from the origin of the X-axis, and k=−1 is given in a case where the 2nd peak sensor is positioned nearer than the 1st peak sensor from the origin of the X-axis.

It is noted that, for example, when the number of the sensors is represented as N, the sensor number is represented as 1 to N, the maximum value of the coordinate value in the X-axis is represented as H, and the sensor number of the 1st peak sensor is represented as Np, the reference coordinate position Xp can be determined by the following formula (11):

$$Xp=(H/N)\times(Np-j) \tag{11}$$

where the instance of the coordinate system is such that the leftmost position in the sensor 1 is determined as the origin of the X-axis, while the rightmost position in the sensor N is determined to have the largest coordinate value: j=0 is given in a case where the 2nd peak sensor is positioned farther than the 1st peak sensor from the origin of the X-axis; and j=1 is given in a case where the 2nd peak sensor is positioned nearer than the 1st peak sensor from the origin of the X-axis.

As mentioned above, the coordinate input device determines the detailed coordinate position of the position coming in contact with the finger 20 with the output values of the sensors. It is noted that the detailed coordinate positions of the X and Y can be determined in such a manner that the processes in Steps ST1 to ST6 are implemented for each of the X-direction and Y-direction.

Next, an effect in a case where the detailed coordinate position is determined by the processes in Steps ST1 to ST6 will be described in comparison with a case where the detailed coordinate position is determined by the conventional method.

Figure 8:
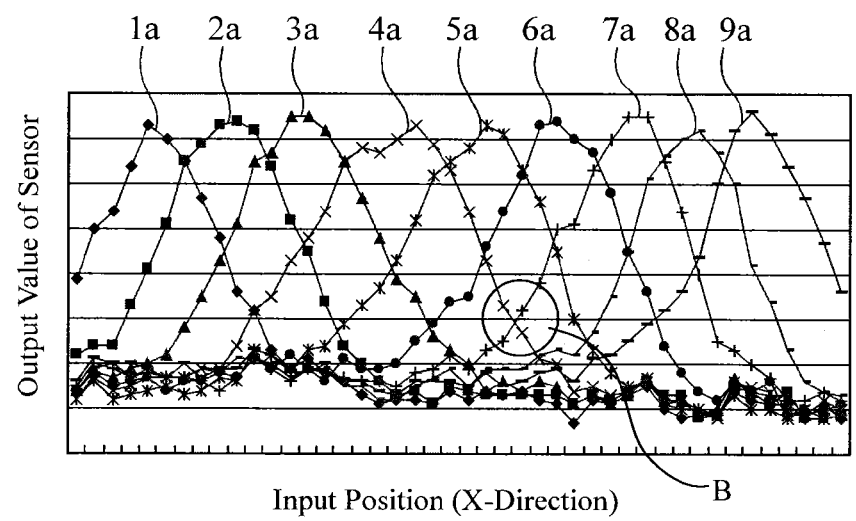
FIG. 8 is a graph in which output values of sensors are measured in a case where a contact position of the finger is gradually moved in a X-direction in the coordinate input device according to Embodiment 1 of the invention.

FIG. 8 is a graph of measured output values of the sensors 1 to 9 in a case where the contact position of the finger 20 is gradually moved in the X-direction on the touch panel 10. In the graph, input positions (namely, contact positions) by the finger 20 in the X-direction are shown on the abscissa, and the magnitudes of the sensor output values are shown on the ordinate, and the output values of the sensors 1 to 9 are plotted as output-value measured lines 1a to 9a. For example, the output-value measured line 6a of the sensor 6 shows the following situation: its output value gradually increases as the input position of the finger 20 increases, and the output value is the largest when the input position is placed at the center position of the sensor 6; however, after the input position is beyond the center position, the output value decreases as the input position increases.

In a case where the finger 20 is placed at the boundary position between the sensor 5 and sensor 6, that is, in an input position where the output-value measured line 5a of the sensor 5 and the output-value measured line 6a of the sensor 6 have almost the same value, it can be seen that the values of the output-value measured lines 4a and 7a of the sensors 4 and 7 adjacent to the sensors 5 and 6 are increased as compared to those of the remaining sensors (region B). This is due to the effects of the electrostatic capacitances C5 and C6 produced through the overlay 30 from the finger 20.

Figure 9:
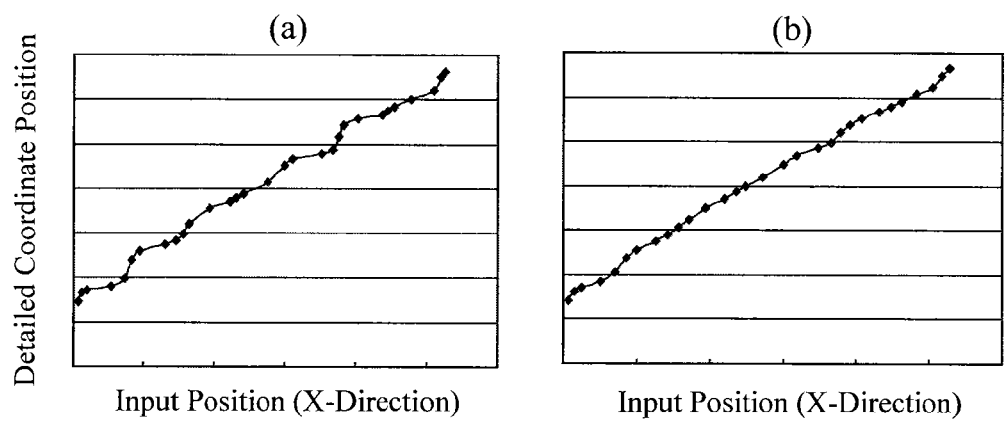
FIG. 9 is graphs showing results in which correction values are determined based on data of the output values of the sensor relative to input positions of the finger in FIG. 8 to interpolate coordinates thereof.

FIGS. 9(a), (b) each are a graph showing results in which the correction values are determined based on data of the output values of the sensors with respect to the input positions of the finger 20 in FIG. 8 to interpolate the coordinates: the input positions in the X-direction are shown on the abscissa, and the detailed coordinate positions after interpolation are shown on the ordinate. FIG. 9(a) shows results in which the correction values are determined by the conventional method (Patent Document 1) to calculate the detailed coordinate positions. FIG. 9(a) shows results in which the correction values are determined by the conventional method (Patent Document 1) to calculate the detailed coordinate positions. FIG. 9(b) shows results in which the correction values d are determined by the coordinate input device according to the present embodiment to calculate the detailed coordinate positions.

In FIG. 9(a), no effects of the electrostatic capacitances C4 and C6 produced through the overlay 30 are taken into consideration. However, the thick overlay 30 in fact exists, which does not lead to a result that the output value of the sensor 6 linearly increases as the finger 20 moves away from the origin of the X-axis under the effect of C4. Similarly, the output value of the sensor 4 also does not lead to a result to linearly increase under the effect of C6. Therefore, in the conventional calculation results of the detailed coordinate positions, deterioration in the linearity thereof is caused.

In contrast, in FIG. 9(b), the detailed coordinate positions are determined by the processing method according to the present Embodiment 1 in consideration of C4 and C6 that have effects through the overlay 30, and hence the linearity of the results in which the detailed coordinate positions are determined is improved in comparison to the conventional, so that accuracy of the detailed coordinate positions can be enhanced.

As described above, according to Embodiment 1, with the plurality of output values obtained from the plurality of sensors 1 to 9 arranged in the touch panel 10, the correction value is determined based on the output value of the 1st peak sensor that outputs the largest output value, the output value of the 2nd peak sensor having the second largest output value, the output value of the 3rd peak sensor having the third largest output value, and the output value of the 4th peak sensor having the fourth largest output value to thus calculate the detailed coordinate position; thus, even in a case where the overlay such as glass becomes thick, an error in the calculation of the detailed coordinate position is reduced to thereby determine more accurately the detailed coordinate position coming in contact with the finger.

Further, when the correction value d is calculated on the assumption that the contact shape of the finger 20 and touch panel 10 is quadrangular, it becomes possible to reduce largely the cost for calculating the correction value.

Embodiment 2

Figure 10:
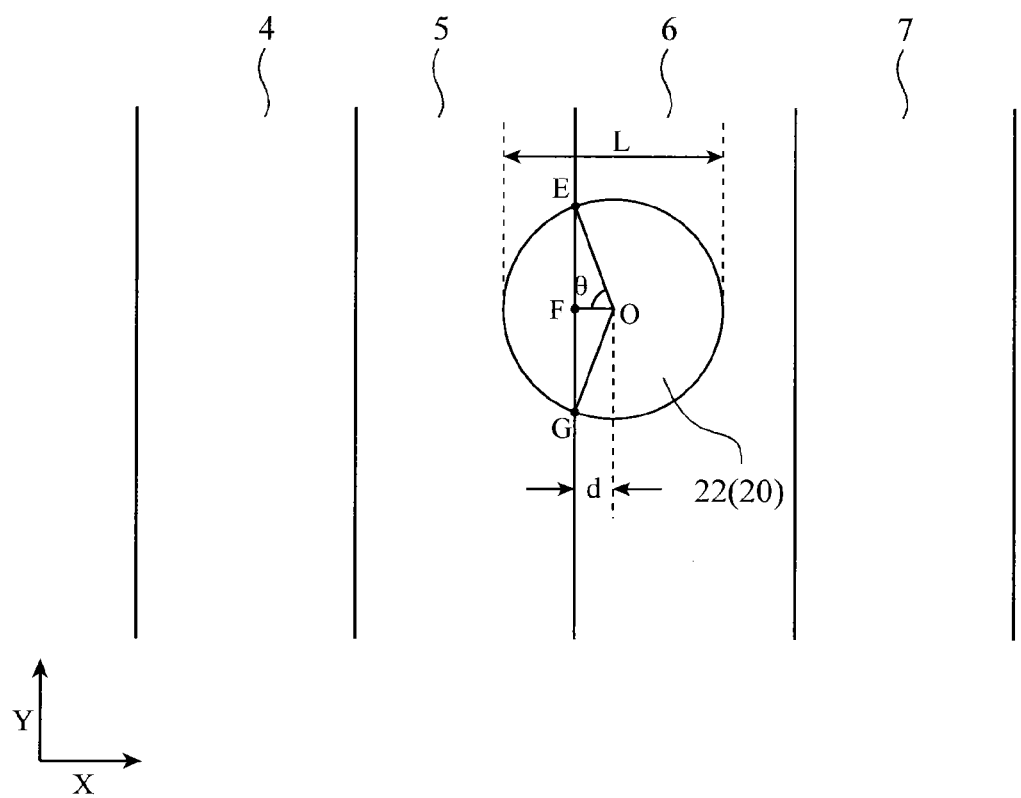
FIG. 10 is an explanatory diagram showing an area of a circular region in which a finger comes in contact with a touch panel in a coordinate input device according to Embodiment 2 of the invention.
Figure 11:
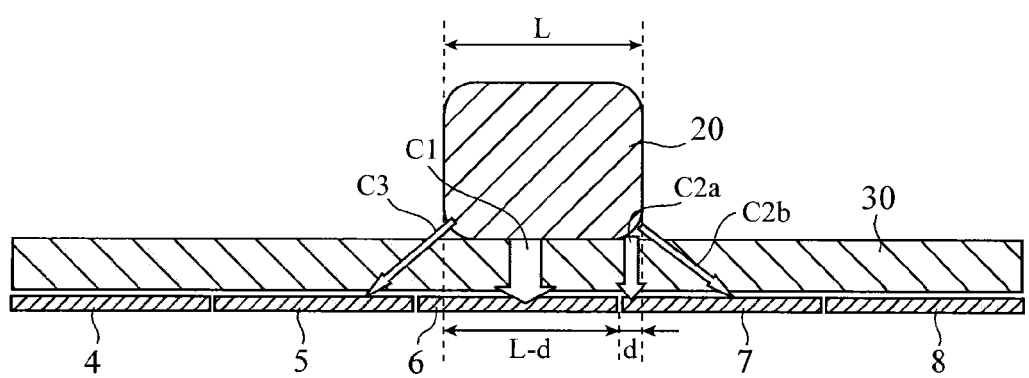
FIG. 11 is a diagram illustrating how to determine a coordinate position by a conventional coordinate input device.

In the above Embodiment 1, the shape of the contact region 21 of the finger 20 as the coordinate pointer is assumed quadrangular as shown in FIG. 3; however, in this embodiment, a description is given of an instance where the finger 20 as the coordinate pointer is put closer to an actual contact-area shape and assumed circular. FIG. 10 is an explanatory diagram showing an area of a circular region (contact region 22) in which the finger 20 is in contact with the touch panel; the same reference numerals are denoted for the same or corresponding parts as/to those in FIG. 3, and descriptions thereof will be omitted. As shown in FIG. 10, the circular contact region 22 represents a condition in which the finger 20 is in contact with parts of the sensor 5 and sensor 6 in a straddling manner; the diameter of the contact region 22 is given as "L" (a value converted into a coordinate value), and the shift amount of the finger 20 from the boundary between the sensor 5 and sensor 6 toward the sensor 6 is given as "d" (a value converted into a coordinate value). Further, the center of the contact region 22 is designated as O, the intersections of the contact region 22 with the boundary between the sensors 5 and 6 are designated as E and G, and the point on the boundary between the sensors 5 and 6 corresponding to the midpoint of a chord EG is designated as F. Also, an angle EOF is designated as $\theta$.

In a case where the contact region of the finger 20 is assumed circular instead of quadrangular, it is just necessary to modify the formula (5) into the following formula (5'), provided that in the contact region 22, the area of an overlapping portion with the sensor 6 is designated as M1, and the area of an overlapping portion with the sensor 5 is designated as M2:

$$f(C1):f(C2)=M1:M2 \qquad (5')$$

Here, the areas of the overlapping portions M1 and M2 can be determined by the following manner, for example. Since OE=L/2 and OF=d, $\theta$ can be determined from $\cos\theta$=OF/OE, and further the area of a sector OEG can be determined from the central angle $2\theta$ of the sector OEG. Next, since EF=OE× $\sin\theta$, the area of the triangle OEG can be determined by OF×OE× $\sin\theta$. A difference between the area of the sector OEG and the area of the triangle OEG is determined, and the resultant is defined as M2. Further, a difference between the area of the contact region 22 and M2 is defined as M1. From the above, the areas of the overlapping portions M1 and M2 can be determined.

However, otherwise, an area ratio in the circular contact region 22 is determined by an appropriate approximation formula, and the formula (5') may be thus modified.

As mentioned above, the correction value calculation unit 12 determines the correction value d by the above formula (5'), and the coordinate calculation unit 13 calculates a detailed coordinate position based on the correction value d.

As described above, according to Embodiment 2, when the correction value d is determined on the assumption that the contact shape between the finger 20 and touch panel 10 is circular, it becomes possible to enhance further the calculation accuracy of the detailed coordinate position coming in contact with the finger.

Incidentally, in the above Embodiments 1 and 2, it is configured to determine the detailed coordinate position in the X and Y directions thereof with the touch panel in which the sensor electrodes are arranged in each of the X and Y directions; however, it may be configured to determine the detailed coordinate position in one dimensional direction with the touch panel in which the sensor electrodes are arranged in either one of the X and Y directions.

Further, in the above Embodiments 1 and 2, the coordinate input device is configured to be applied to the touch panel that detects the contact of the finger by the electrostatic capacitance detection method of detecting the electrostatic capacitances produced between the finger and sensors; however, it is not limited thereto; for example, the coordinate input device of Embodiment 1 may be applied to any method of detecting a signal such that the output value of the sensor changes continuously according to the contact position, such as an electromagnetic induction type one in which an inductive voltage is detected by way of an electronic pen as the coordinate pointer and an antenna coil.

Furthermore, in the above Embodiments 1 and 2, the method of determining the detailed coordinate position is described by using the condition where the finger comes in contact with the touch panel as an example; however, when the sensitivity of the touch panel is sufficiently high, and the output values of the sensors in the touch panel can be obtained even in a proximate condition of the finger before coming in contact with the touch panel, it is possible to determine the detailed coordinate position not only in the contact condition of the finger with the touch panel, but also in the proximate condition thereto. Specifically, as exemplified in the above Embodiments 1 and 2, the overlapping region in the contact condition of the finger with the touch panel has only to be replaced with the overlapping region in the proximate condition of the finger to the touch panel.

It is noted that in the present invention, it is possible to freely combine the embodiments, modify any component of the embodiments, or omit any component in the embodiments within the scope of the invention.

INDUSTRIAL APPLICABILITY

As mentioned above, the coordinate input device according to the invention is also suitable for use in even the case where the overlay such as glass becomes thicker such that the detailed coordinate position where the finger comes in contact with the touch panel cannot be detected with high accuracy in the conventional method.

DESCRIPTION OF REFERENCE NUMERALS AND SIGNS 1 to 9: sensors, 1a to 9a: output-value measured lines, 10: touch panel, 11: peak sensor detection unit, 12: correction value calculation unit, 13: coordinate calculation unit, 14: control unit, 20: finger (object), 21, 22: contact region of finger 20, 23: center line of contact region 21, 30: overlay, C1 to C6: electrostatic capacitances, d: distance from center position of finger 20 to boundary position of sensors (correction value), L: width of finger 20, width of sensor, and diameter of contact region 22, V1: output value of 1st peak sensor, V2: output value of 2nd peak sensor, V3: output value of 3rd peak sensor, V4: output value of 4th peak sensor.

The invention claimed is:

1. A coordinate input device for determining a coordinate of an overlapping position of an object to a touch panel, comprising:
a peak sensor detection unit for comparison of respective magnitudes of output values obtained from a plurality of sensors arranged in the touch panel in order to select on the basis of the magnitudes of the output values a 1st peak sensor which had the largest output value;
a correction value calculation unit for determination of a correction value on the basis of information of an output value of the 1st peak sensor detected by the peak sensor detection unit and information of an output value of a peripheral sensor of the 1st peak sensor; and
a coordinate calculation unit for determination of a detailed coordinate of the overlapping position with the correction value calculated by the correction value calculation unit,
wherein the correction value calculation unit;
selects a 2nd peak sensor, which is an individual sensor arranged in a separate position different from that of the 1st peak sensor, having the second largest output value next to the output value of the 1st peak sensor and a 3rd peak sensor, which is an individual sensor arranged in a separate position different from the 1st and 2nd peak sensors, having the third largest output value from sensors on both ends of the 1st peak sensor,
selects a 4th peak sensor, which is an individual sensor arranged in a separate position different from the 1st, 2nd and 3rd peak sensors, having the fourth largest output value on the basis of a position of the 2nd peak sensor, and
determines the correction value on the basis of the output value of the 1st peak sensor, the output value of the 2nd peak sensor, the output value of the 3rd peak sensor, and the output value of the 4th peak sensor.

2. The coordinate input device according to claim 1, wherein the correction value calculation unit determines the correction value on the basis of a difference between the output value of the 1st peak sensor and the output value of the 4th peak sensor divided by a difference between the output value of the 2nd peak sensor and the output value of the 3rd peak sensor.

3. The coordinate input device according to claim 1, wherein the correction value calculation unit determines the correction value on the assumption that the shape of an overlapping region of the object with the touch panel is a quadrangle.

4. The coordinate input device according to claim 3, wherein the correction value calculation unit calculates the correction value as:

$$d=\{(V1-V2+V3-V4)/(V1+V2-V3-V4)\} \times L/2,$$

where $V1$, $V2$, $V3$, and $V4$ are respectively the output values of the $1^{st}$ through $4^{th}$ peak sensors, and L is a dimension of the quadrangle.

5. The coordinate input device according to claim 1, wherein the correction value calculation unit calculates the correction value on the assumption that the shape of an overlapping region of the object with the touch panel is a circle.

6. The coordinate input device according to claim 1, wherein in the correction value calculation unit, only the output value of the 1st peak sensor, the output value of the 2nd peak sensor, the output value of the 3rd peak sensor, and the output value of the 4th peak sensor are utilized for calculation of the correction value.

7. The coordinate input device according to claim 1, wherein in the correction value calculation unit, said output value of the 4th peak sensor is from one of the sensors adjacent the 1st peak sensor.

8. The coordinate input device according to claim 1, wherein, in the peak sensor detection unit, said comparison of the respective magnitudes of the output values compares values representative of capacitances between the object and the sensors.

9. The coordinate input device according to claim 1, wherein, in the coordinate calculation unit, the detailed coordinate comprises an X-coordinate along a first array of said sensors in an X-direction of the touch panel.

10. The coordinate input device according to claim 9, wherein, in the coordinate calculation unit, the detailed coordinate comprises a Y-coordinate along a second array of said sensors in a Y-direction of the touch panel.

11. A touch panel device comprising:
a touch panel having a plurality of sensors which outputs output values of the sensors; and
a coordinate input device including,
a peak sensor detection unit for comparison of respective magnitudes of the output values obtained from the plurality of sensors in the touch panel in order to select on the basis of the magnitudes of the output values a 1st peak sensor which had the largest output value,
a correction value calculation unit for determination of a correction value on the basis of information of an output value of the 1st peak sensor detected by the peak sensor detection unit and information of an output value of a peripheral sensor of the 1st peak sensor, and a coordinate calculation unit for determination of a detailed coordinate of the overlapping position with the correction value calculated by the correction value calculation unit, wherein the correction value calculation unit;

selects a 2nd peak sensor, which is an individual sensor arranged in a separate position different from that of the 1st peak sensor, having the second largest output value next to the output value of the 1st peak sensor and a 3rd peak sensor, which is an individual sensor arranged in a separate position different from the 1st and 2nd peak sensors, having the third largest output value from sensors on both ends of the 1st peak sensor, selects a 4th peak sensor, which is an individual sensor arranged in a separate position different from the 1st, 2nd and 3rd peak sensors, having the fourth largest output value on the basis of a position of the 2nd peak sensor, and determines the correction value on the basis of the output value of the 1st peak sensor, the output value of the 2nd peak sensor, the output value of the 3rd peak sensor, and the output value of the 4th peak sensor.

12. The touch panel device according to claim 11, wherein the correction value calculation unit determines the correction value on the basis of a difference between the output value of the 1st peak sensor and the output value of the 4th peak sensor divided by a difference between the output value of the 2nd peak sensor and the output value of the 3rd peak sensor.

13. The touch panel device according to claim 11, wherein the correction value calculation unit determines the correction value on the assumption that the shape of an overlapping region of the object with the touch panel is a quadrangle.

14. The touch panel device according to claim 13, wherein the correction value calculation unit calculates the correction value as:

$$d=\{(V1-V2+V3-V4)/(V1+V2-V3-V4)\}\lambda L/2,$$

where $V1$, $V2$, $V3$, and $V4$ are respectively the output values of the 1st through 4th peak sensors, and $L$ is a dimension of the quadrangle.

15. The touch panel device according to claim 11, wherein the correction value calculation unit calculates the correction value on the assumption that the shape of an overlapping region of the object with the touch panel is a circle.

16. The touch panel device according to claim 11, wherein in the correction value calculation unit, only the output value of the 1st peak sensor, the output value of the 2nd peak sensor, the output value of the 3rd peak sensor, and the output value of the 4th peak sensor is utilized for calculation of the correction value.

17. The touch panel device according to claim 11, wherein in the correction value calculation unit, said output value of the 4th peak sensor is from one of the sensors adjacent the 1st peak sensor.

18. The touch panel device according to claim 11, wherein, in the peak sensor detection unit, said comparison of the respective magnitudes of the output values compares values representative of capacitances between the object and the sensors.

19. The touch panel device according to claim 11, wherein, in the coordinate calculation unit, the detailed coordinate comprises an X-coordinate along a first array of said sensors in an X-direction of the touch panel.

20. The touch panel device according to claim 19, wherein, in the coordinate calculation unit, the detailed coordinate comprises a Y-coordinate along a second array of said sensors in a Y-direction of the touch panel.

* * * * *